(12) United States Patent
Ijtsma et al.

(10) Patent No.: US 6,760,288 B2
(45) Date of Patent: Jul. 6, 2004

(54) METHOD OF IMMEDIATE WRITING OR READING FILES ON A DISC LIKE RECORDING MEDIUM

(75) Inventors: Pope Ijtsma, Eindhoven (NL); Dirk Hamelinck, Hasselt (BE); Jakob Gerrit Nijboer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/462,346

(22) Filed: Jun. 16, 2003

(65) Prior Publication Data

US 2003/0210627 A1 Nov. 13, 2003

Related U.S. Application Data

(63) Continuation of application No. 09/668,542, filed on Sep. 25, 2000, now Pat. No. 6,606,285.

(30) Foreign Application Priority Data

Sep. 23, 1999 (EP) .............................. 99203111
Jan. 27, 2000 (EP) .............................. 00200290

(51) Int. Cl.⁷ ............................................... G11B 7/00
(52) U.S. Cl. ................. 369/53.18; 369/59.25
(58) Field of Search .................... 369/53.18, 53.14, 369/53.15, 53.17, 59.25

(56) References Cited

U.S. PATENT DOCUMENTS

| | | | |
|---|---|---|---|
| 5,111,444 A | 5/1992 | Fukushima et al. ........... 369/58 |
| 5,404,357 A | 4/1995 | Ito et al. ..................... 371/21.2 |
| 5,623,470 A | 4/1997 | Asthana et al. | |
| 5,914,928 A | 6/1999 | Takahashi ..................... 369/58 |
| 6,084,839 A | * 7/2000 | Sims ...................... 369/124.07 |
| 6,189,118 B1 | 2/2001 | Sasaki et al. ............... 714/710 |
| 6,373,800 B1 | 4/2002 | Takahashi ................ 369/53.15 |
| 6,418,111 B1 | 7/2002 | Takemura et al. ....... 369/375.3 |
| 6,469,978 B1 | 10/2002 | Ohata et al. ............. 369/275.3 |

FOREIGN PATENT DOCUMENTS

| | | |
|---|---|---|
| EP | 0541219 A1 | 5/1993 |
| EP | 0798711 A1 | 10/1997 |
| EP | 0798716 A1 | 10/1997 |

* cited by examiner

*Primary Examiner*—Nabil Hindi
(74) *Attorney, Agent, or Firm*—Michael E. Belk

(57) ABSTRACT

A blank writable disc contains a lead-in area followed by a program area, followed by a lead-out area. When the disc is inserted into a recorder, the disc is initialized by recording control data in a lead-in area. The control data defines a general purpose area (GPA) within the program area of the disc. Then user data is recorded within a user portion of the program area, the user portion being outside of the GPA. After the user data is recorded formatting of the disc begins. The formatting includes recording format data in the user portion of the program area. Then, prior to ejecting the disc from the recording apparatus, if the formatting of the disc is not yet complete, then the disc is finalized by recording additional control data in the lead-in area and in a lead-out area without completing the formatting of the entire disc.

24 Claims, 8 Drawing Sheets

Figure 4:
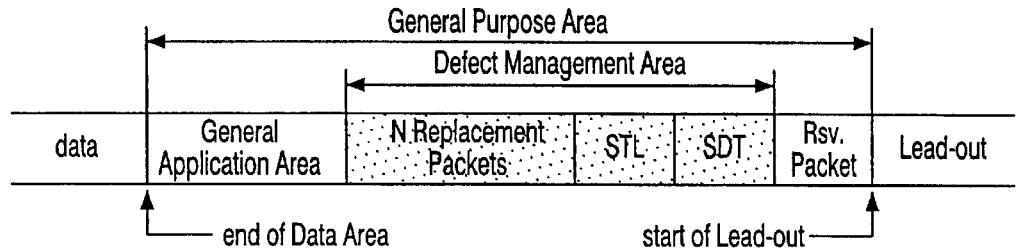

FIG. 1
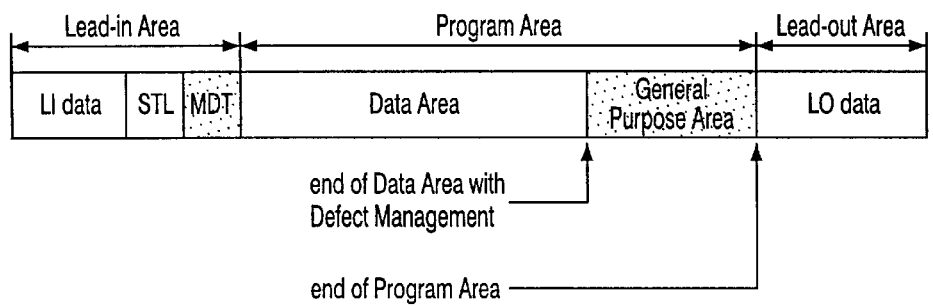
FIG. 2
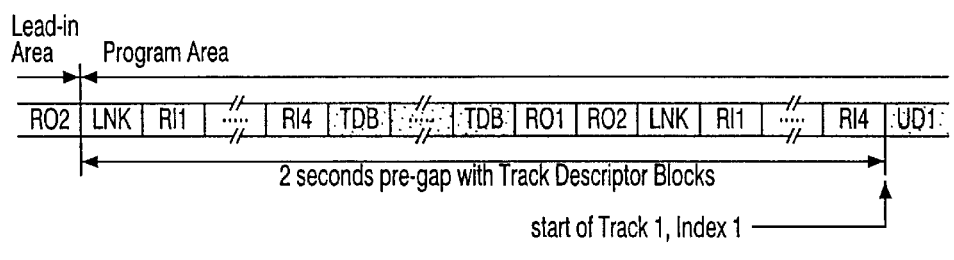
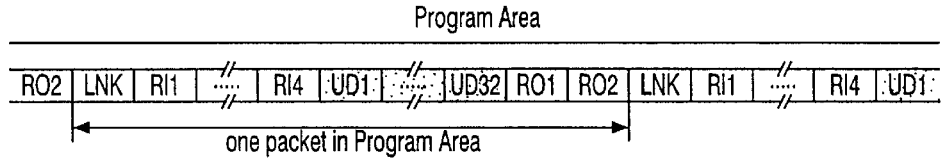
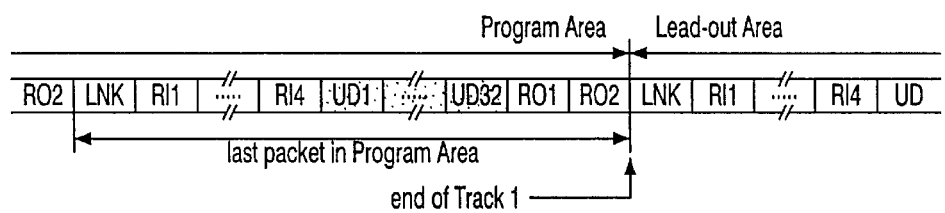
FIG. 3

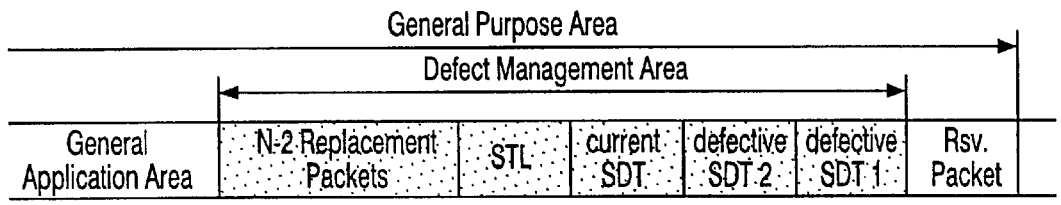
FIG. 7
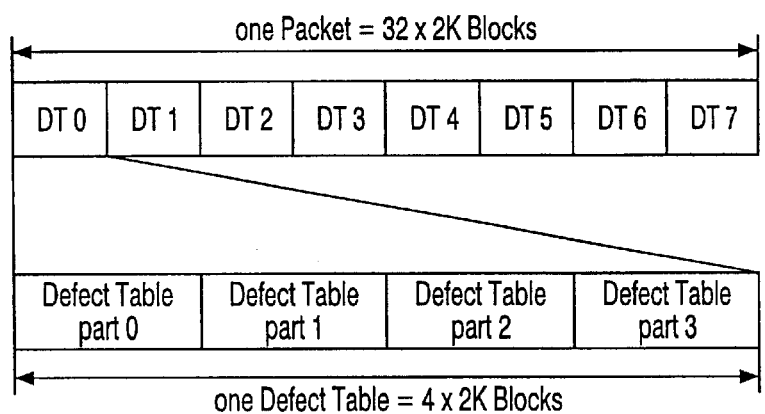
FIG. 8
| BP in sector | Contents | Length in bytes |
|---|---|---|
| 0 | Signature of the STL ("STL") | 3 |
| 3 | Version number | 1 |
| 4 | DT update count (FFFFh indicate invalid table) | 2 |
| 6 | Reserved | 2 |
| 8 ... 2047 | Reserved | 2040 |
FIG. 10

| BP in sector | Contents | Length in bytes |
|---|---|---|
| 0 | Signature of the DT ("MDT" or "SDT" or "TDT") | 3 |
| 3 | Version number | 1 |
| 4 | DT update count (FFFFh indicate invalid table) | 2 |
| 6 | DT number (first 4 bits: binary value 0-7) / DT part number (last 4 bits: binary value 0-3) | 1 |
| 7 | Number of DT parts actually in use | 1 |
| 8 | Total number of replacement entries in the DT | 2 |
| 10 | Reserved | 6 |
| 16 | Start of General Purpose Area | 3 |
| 19 | Size of Replacement Area | 2 |
| 21 | Size of General Application Area | 3 |
| 24 | Disc Status | 2 |
| 26 | Last written Address (LWA) | 3 |
| 29 | Reserved | 3 |
| 32 | DT Entry 0 | 6 |
| 38 ... 2047 | DT Entries 1 ... 335 | 335 x 6 |

FIG. 9

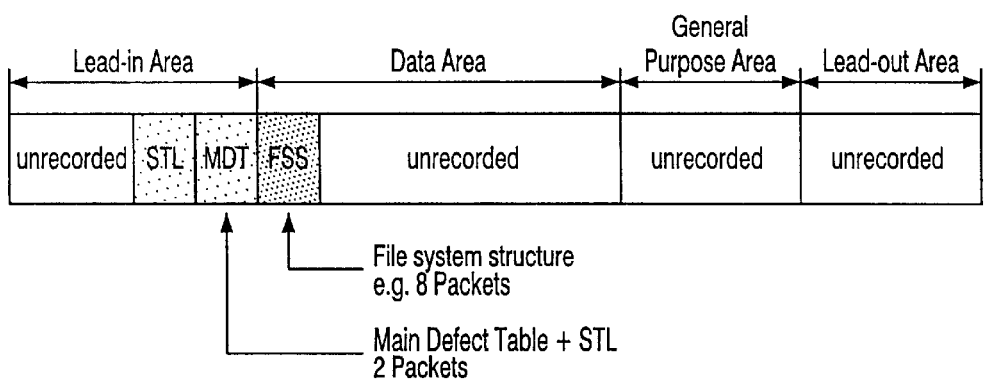

FIG. 11

METHOD OF IMMEDIATE WRITING OR READING FILES ON A DISC LIKE RECORDING MEDIUM

This application is a continuation of patent application Ser. No. 09/668,542 filed Sep. 25, 2000, now patent 6,606,285.

The invention relates to a method of recording digital information signals on a removable rewritable disc like recording medium, with a program area of the disc and, prior to removal of the disc out of a recording apparatus, finalizing the disc with a lead-in and lead-out area comprising control information.

The invention further relates to an apparatus for recording digital information signals on/from a removable rewritable disc like recording medium, the apparatus comprising inputting means for receiving digital information signals, recording medium, receiving means for receiving the recording medium, recording means for reading the digital information signals on the recording medium, reading means for digital information signals stored on the recording medium, outputting means for outputting the read digital information signals, controlling means adapted to control recording digital information signals representing user data on a program area on the recording medium.

The PC world needs a replacement for the floppy drive. A rewritable storage medium of the disc like optical type, such as the CD-RW, seems to be a logical choice because the read function of the magnetic floppy is already replaced by the CD-ROM. All PC's today are equipped with a CD-ROM and applications and software are distributed on CD-ROM. Therefore a recording medium like CD-RW or rewritable DVD, seems to be the perfect media to fill in the needed write capability. Recording media of the magneto-optical type already tried to fill this gap, but they all miss compatibility with the installed base. That is exactly what CD-RW for instance can deliver with the installed base of over approximately 200 million CDROM drives. CD-RW media are cheap and the capacity is sufficient for floppy use.

Furthermore, manufacturers of operating systems wants to get rid of legacy material like the floppy drive. For OEM companies the idea is attractive, as they can replace the floppy drive, the CD-ROM and the DVD-ROM drive by a one spindle drive like a Combi and by a double writer in the future. It will also add a new feature to the drive other then the ever-increasing speed There are products on the market which enable to use a CD-RW like a floppy drive, but they don't behave the way one would expect a CD floppy drive would do. The access time is too low, formatting time is too long and more important the drive does not fit into the strategy of current OS. The disc should be immediately available for dragging and dropping of files. A fast eject is required, deleting should be instant. Due to enable multiple drag and drop a defect management is required. However, the defect management should be done by the drive. This opens the way to use UDF 1.02 instead of UDF 1.5, which is not supported on the write side by manufacturers of Operating systems. Further background formatting must be done by the drive and not by the application or OS to minimize bus traffic, and interaction between the drive and the OS. Finally, Read/Modify/Write for packets should be done by the drive.

In consequence, amongst other things, it is an object of the invention to obviate the above-mentioned disadvantages. According to one of its aspects a method according to the invention is characterized by performing an initialization step comprising recording control data in a lead-in area which control data defines a general purpose area (GPA) within the program area of the disc and where after the disc is ready to record user data in a remaining data area of the program are.

Because of the very limited amount of data to be recorded, this step will be finished in just a few seconds. The disc is then ready for data storage. Further, the general purpose area can be used to add additional functionality by, for instance, storing device driver programs herein or allowing disc space to be used by said programs. As the general purpose area is still readable by legacy drives as this drives will report the start of the Lead-out area as the end of the user area, these drives may employ the added functionality. Thus compatibility is achieved.

An advantageous embodiment is obtained by adding defect management. In this case, the initialization-step comprises: defining a main defect table (MDT) in the lead-in area adapted to contain a list of address of defect areas and replacement areas; and defining a defect management area (DMA) within said general purpose area (GPA) adapted to contain replacement areas for defect-management. This is required in case of adding file drag and drop functionality equivalent to removable disc functionality.

A further advantageous embodiment is obtained by reserving space for device drivers to handle defect management. In this embodiment the initialization step comprises defining a general application area (GAA) within the general purpose area (GPA) adapted to contain application drivers adapted to handle defect management and/or support of specific operating systems. This enables legacy drives to handle the defect areas.

A further improvement is obtained by adding a sentinel area next to a defect table. In this case the initialization step comprises: defining a sentinel area (STL) within the lead-in area comprising dummy data adapted to be overwritten by a new main defect table when the main defect table (MDT) becomes defective. This sentinel area may be used advantageously for storage of proprietary information such as copy right information. This area may also be used to store a new defect table when the old table is wearing out.
drive is idle. In this case the initialization step is followed by a back-ground formatting step intended to be performed when no user data is being written to the disc, the background formatting step comprising: a de-icing step comprising recording dummy data in blank areas within the data area, said de-icing step to be performed in the back-ground until the complete data area has been recorded with dummy data when not recorded already with user data. This has the advantage the medium is formatted before an eject request occurs.

The next embodiment performs a finalization step. The recording medium will be in a CD-ROM compatible state while the secondary defect table (SDT) is readable by a CD-ROM reader or legacy reader.

However, an advantageous embodiment is obtained by allowing an early-eject step. The eject time is made as short as possible while the recording medium leaves the drive in a CD-ROM or legacy drive compatible state. All data is recorded contiguously while the temporary defect table (TDT) may be used for defect management.

Other advantageous embodiments are disclosed in the description.

Figure 5:
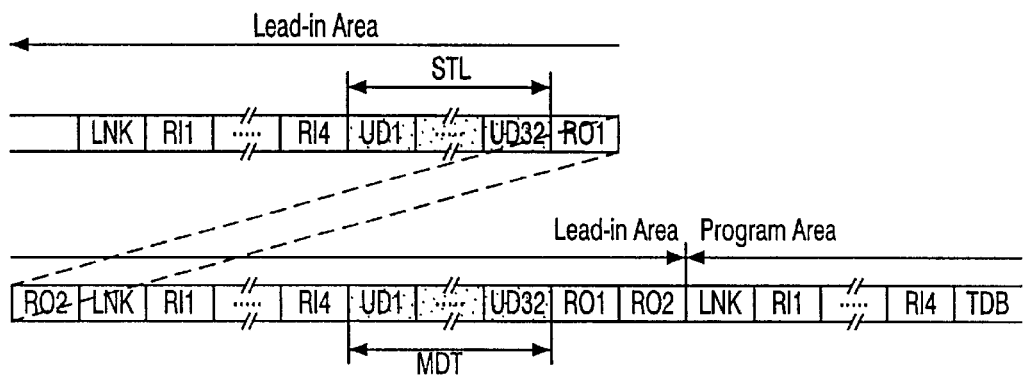
Figure 6:
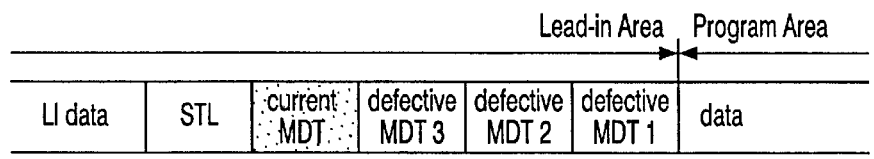
Figure 12:
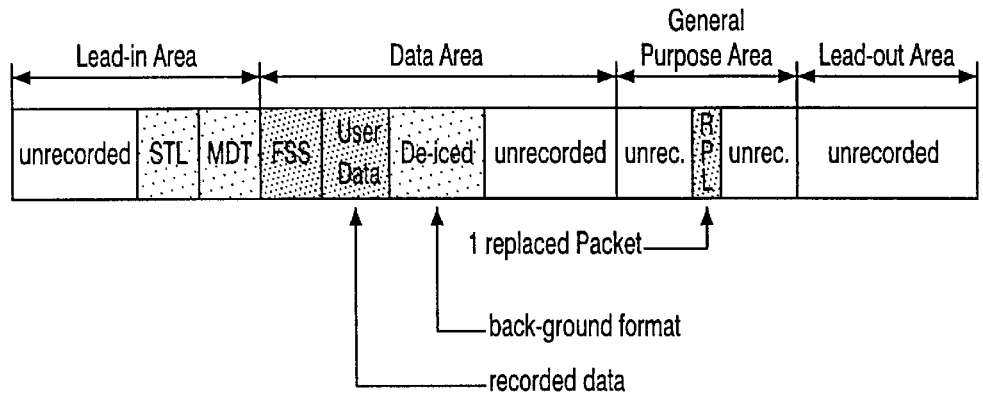
Figure 13:
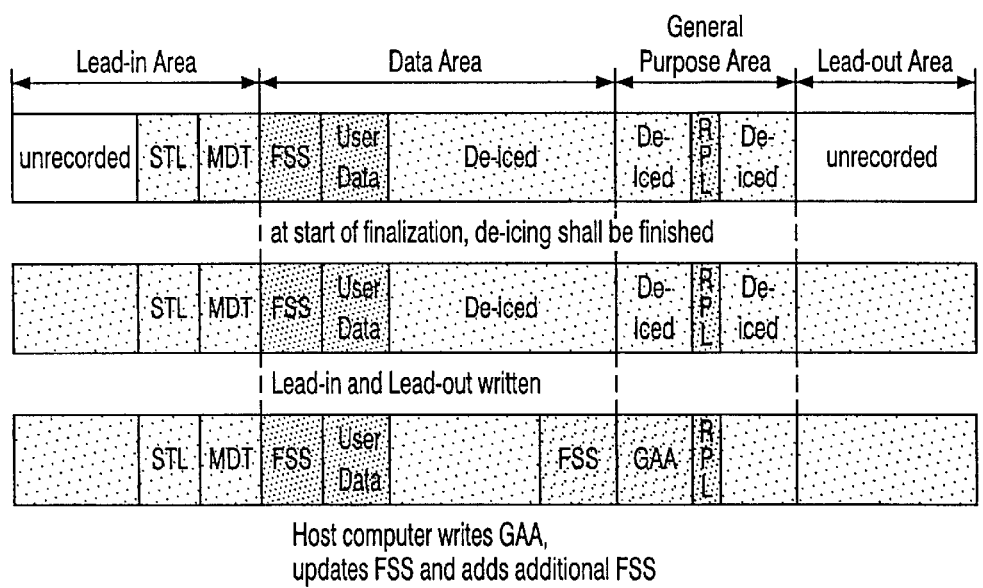
Figure 14:
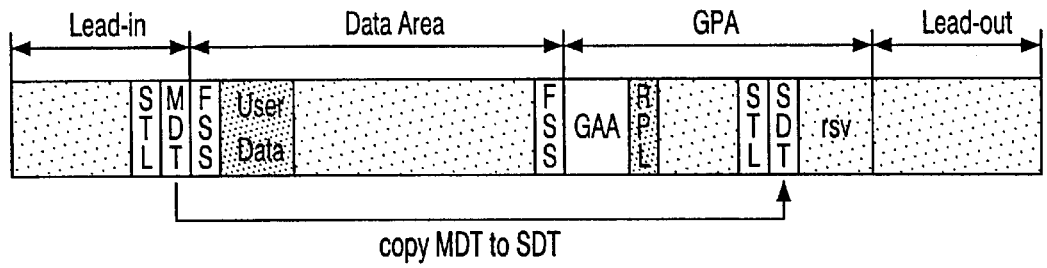
Figure 15:
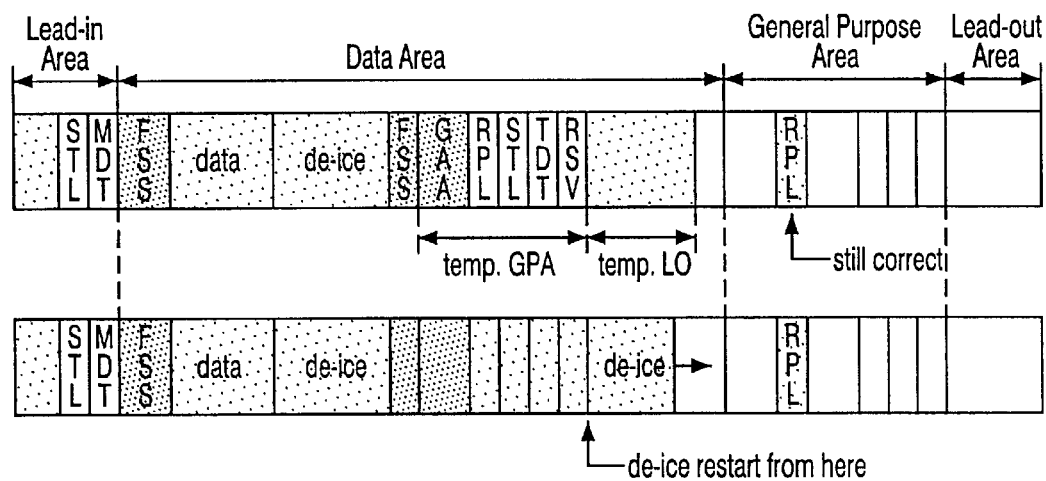

These and further aspects and advantages of the invention will be discussed in more detail hereinafter with reference to the disclosure of preferred embodiments, and in particular with reference to the appended Figures that show:

FIG. 1 a basic disc lay-out of a CD-ROM;
FIG. 2 a lay-of a disc according to the invention;
FIG. 3 linking details of the Program Area;
FIG. 4 the lay-out of the General Purpose Area;
FIG. 5 the location of the first Main Defect Table (MDT) in the Lead-In Area;
FIG. 6 the replacement of a defective MDT;
FIG. 7 the replacement of a defective Secondary Defect Table (SDT);
FIG. 8 the composition of a Defect Table Packet;
FIG. 9 the lay-out of the Defect Table;
FIG. 10 the lay-out of the Sentinel Packet;
FIG. 11 the status of the disc after initialization;
FIG. 12 the status of the disc after some de-icing and recording;
FIG. 13 the status of the disc after several steps of finalization;
FIG. 14 shows an example of the final status of a disc;
FIG. 15 the early-eject status of the disc,
FIG. 16 the re-opened status of the disc and
FIG. 17 a computer data system comprising a computer and a recording apparatus.

FIG. 1 illustrates schematically the basic format of a CD-ROM, as known from the relevant standard, which is often denoted to as the 'Yellow book', in analogy to the 'Red book' standard for the audio CD. Descriptions of the physical standard of the CD-ROM can be found in the public available documents ISO/IEC 10149, of the audio-CD in IEC 908. The physical standard for the recordable CD, denoted as the 'Orange book; is disclosed in ISO/IEC 11172/1/2/3/. The standard for the logical format of the CD-ROM is described in ISO-9660 (the High Sierra standard) and for the recordable CD in ECMA 168/ISO13940 (the Frankfurter proposal).

The data carrying area of the CD-ROM starts with a LEAD-IN area, a DATA AREA is available for user data and ends with a LEAD-OUT area.

The methods for Defect Management and Formatting described in this description can be used to optimize the performance of High-speed CD-RW in a computer environment. To exploit the full capabilities of High-speed CD-RW in a computer data storage environment, several conditions should be fulfilled:

1) the system needs random access,
2) the recorded discs shall be compatible with Multi-read compliant CD-ROM drives,
3) the system needs a method of Defect Management that can be handled by the drive or by a dedicated device driver,
4) formatting shall be performed by the drive in back-ground (no interaction with the application or Operating System running on the computer),
5) the disc has to be available for use immediately after insertion and the eject time shall be minimal,
6) recording is based on fixed Packets of 32 User Data blocks, in a single Track, on a Single-session disc.

To guarantee read compatibility with Multi-read CD-ROM drives (or legacy CD-R/RW recorders), the following requirements have to be fulfilled:
the disc has a Lead-in Area, a Program Area and a Lead-out Area,
all Program Area between the Lead-in Area and the Lead-out Area shall be fully formatted,
all data, including the Defect Management information and Replacement Areas have to be available inside the Program Area (the logically addressable space) of the disc. The Defect Management then can be handled by a dedicated device driver running under the Operating System of the computer. When a disc fulfils all these conditions, we call such a disc: "ROM-compatible". Because current CD-ROM drives do not support Defect Management, optional device drivers, which can add this functionality to the system, could be given along in the General Purpose Area, e.g. during formatting.

The Defect Management system is based on a Main Defect Table (MDT) in the Lead-in Area of the disc, and a Secondary Defect Table (SDT) and Replacement Packets in the General Purpose Area. The Defect Tables shall be preceded by a so-called Sentinel Packet (STL) containing all 00h bytes. The general lay-out of the disc obtained with a method according to the invention is illustrated with reference to FIG. 2.

The General Purpose Area is located preferentially at the outside of the disc against the Lead-out area. A CD-writer with defect management according to the invention, will report the start address of the General Purpose Area as the start address of the Lead-out area. An UDF-file system gets thus a smaller partition to use. The part not used is reserved for replacement areas and contains the defect tables. In contrast to a legacy drive that will still report the end of the original Lead-out address. This trick is needed to make defect management backward compatible with legacy drives such as CD-ROM. A CD-ROM reader is able to read the defect management area because it will be in its data area. A device driver will perform the defect management in case of a legacy drive. Future CD-ROM readers should get the ability to handle the defect management themselves. This is only a firmware change in the ROM firmware. A writer Lead-out pointer should be added to the firmware. Compatibility with CD/DVD-ROM is obtained by a device driver or application that reads the defect table and handles the defect management. The operating system thus interacts with a CD-ROM, a legacy CD-RW, DVD-ROM or DVD-RAM only by a device driver or application that handles the defect mangement. The CD-RW with the improved format according to the invention interacts directly with the Operating System.

Generally the end-user of the system likes to have the disc ready for use within seconds after it has been inserted into the drive. A blank disc however has to be formatted before all it's capabilities can be exploited fully. Because the normal formatting process takes too much time, a background formatting procedure will be defined that initializes the disc with a minimum amount of information, after which it is available for recording, and then proceeds with the formatting during the time intervals when the drive is idle. The background formatting only defines the physical formatting of the disc, which is system independent. A fully formatted disc is always in a ROM-compatible state. An eject command can be executed without delay. When an eject is requested before the disc has been fully formatted, a quick finishing process shall be executed to make the disc ROM-compatible before it leaves the recorder.

According to the existing CD-RW recording format, data may be recorded in several distinct writing actions. This is referred to as incremental writing. In case of incremental writing, linking rules of recorded data must be taken into account. A link position is the physical location on the disc where the recording of EFM signals is allowed to start and stop. In case of data recording, an EFM recording sequence shall start and end with Link, Run-in and Run-out blocks. No gap between recordings is allowed, One set of recorded Link, Run-in, User Data and Run-out blocks is called a Packet. The number of User Data blocks in a packet is called the Packet size. The Link block contains the link position.

FIG. 3 shows details of the Linking in the Program Area according to the existing CD-RW format. The Program Area consists of one Track with fixed Packets with a size of 32 User Data Blocks. Herein is: LNK=Link Block, RI1..RI4= Run-in Blocks, RO1, RO2=Run-out Blocks, UD1 . . . UD32=User Data Blocks and TDB=Track Descriptor Block FIG. 4 shows the lay-out of the General Purpose Area (GPA) according to the invention. The General Purpose Area (GPA) consists of three parts:
the General Application Area (GAA),
the Defect Management Area (DMA),
a Reserved Packet.

The GPA is located within the logically addressable space of the disc (see FIG. 2) at the end of the Program Area, immediately preceding the Lead-out Area. The Defect Management system shall not be active in the GPA, so there is no replacement for defective Packets in the GPA. The General Application Area (GAA) can be used for storage of data that does not allow replacements by the Defect Management. Such as application programs or device drivers that can handle defect management. Or support of multiple operating systems employing UDF or ISO 9660 files system. Or support of multiple sources like music/video play. The size of the GAA is defined during the formatting of the disc. It is allowed to specify a length=0 for the GAA.

The Defect Management Area (DMA) consists of N Packets meant for replacement of defective Packets in the Data Area, a Sentinel Packet (STL), and the Secondary Defect Table (SDT). The number of Replacement Packets N is defined during the formatting of the disc. The SDT is meant for use by CD-ROM drives and legacy CD recorders for Defect Management during read-out. It is also a back-up in cases of failures in the MDT. The SDT is contained in one Packet. The SDT shall be preceded by a Sentinel Packet. The content of all 2K Blocks of the Sentinel Packet shall be all zeroes. The last Packet of the GPA shall be a Reserved Packet. This Packet shall not be used for any other purpose than for File System use.

The defect Management system of High-speed CD-RW is based on a Main Defect Table(one Packet) located in the Lead-in Area, a Secondary Defect Table, containing a copy of the MDT, in the General Purpose Area and Replacement Packets in the General Purpose Area. FIG. 5 shows the location of the first MDT in the Lead-In area.

The Defect Management of a recorder only replaces full Packets, which are found to be defective during writing or reading. Detection of possible errors can be based on e.g. excessive servo signals, feedback from a "running OPC" during writing, or error flags from the error correction system during reading.

The MDT can be updated by a recorder at each occasion of a defect detection. If the MDT is wearing out because of too many overwrites (or becomes defective for other reasons of failure), a new STL Packet is created just preceding the existing STL Packet and then the old STL Packet is be overwritten by a new MDT Packet. FIG. 6 shows the replacement of a defective MDT. The defective MDT Packet shall be overwritten with a DT with the update count field set to FFFFh, indicating that this table is no longer valid.

The SDT only needs to be updated when the disc is ejected from a recorder. If the SDT is wearing out because of too many overwrites (or becomes defective for other reasons of failure), a new STL Packet is created just preceding the existing STL Packet and then the old STL Packet is overwritten by a new SDT, which is illustrated with reference to FIG. 7. The defective SDT Packet shall be overwritten with a DT with the update count field set to FFFFh, indicating that this table is no longer valid. The number of Replacement Packets shall be decreased by one and the Defect Tables shall be adapted accordingly.

Thus, according to an embodiment of the method of the invention three Defect Tables are defined:
the Main Defect Table (MDT), located in the Lead-in Area,
the Secondary Defect Table (SDT), located in the General Purpose Area (GPA) and which is an exact copy of the MDT. Additionally, according to an embodiment of the method of the invention, a third Defect Table is defined:
a Temporary Defect Table (TDT). This TDT is created instead of the SDT, when an eject is requested before the Back-ground Formatting process has been finished, which will be discussed later.

All Defect Tables have the same lay-out and after ejecting the disc from a recorder, they contain the same information. Each Defect Table (DT) is contained in 4 consecutive Blocks, which 4 Blocks are repeated 8 times to fill up a complete Packet. FIG. 8 shows the composition of a Defect Table Packet. This repetition gives a good protection against local defects in the disc (dust, scratches, etc.). The Packet shall be filled consecutively, starting with DT 0, part 0 and ending with DT 7, part 3.

The Defect Table contains a list of Packets, which have been determined to be defective during verification or during use of the media, and a list of Packets reserved for replacements. The defective Packet shall be linearly replaced by a reserved Packet as assigned in the Defect Table. Identifying defective Packets may happen either during read or write operations by a recorder.

Each 2K Block in the Defect Table Packet shall have the contents as defined in FIG. 9, which shows the Lay-Out of the Defect Table. The addressing method that shall be used for the Defect Management is according to Logical Block Numbering. With reference to FIG. 9, the specific bytes have the following content:
Byte 0~2: Signature:
These 3 bytes shall be set to:

4D4454h, representing the characters "MDT", in each Block of an MDT,
534454h, representing the characters "SDT", in each Block of an SDT,
544454h, representing the characters "TDT", in each Block of an TDT.
Byte 3: version number:
this byte shall be set to 00h
Byte 4,5: DT update count
These bytes shall indicate the total number of update operations on this Defect Table. This field shall be set to 0000h during the creation of the DT, and shall be incremented by one each time the DT is re-written. If the DT Packet is defective, this Packet shall be overwritten with a DT with the update count field set to FFFFh, indicating that this table is no longer valid.
Byte 6: DT number/DT part number
The most significant 4 bits of this byte specify the DT number in the Packet as a binary value 0~7. The least significant 4 bits of this byte specify the part number in the DT as a binary value 0~3.
Byte 7: DT parts in use
This byte specifies the number of parts (0~4) of the DT that actually contain valid DT Entries.

Byte 8,9: Number of DT Entries:
These 2 bytes indicate the number of replacement entries in the DT (total of all 4 parts). The value shall be equal to the number of Replacement Packets in the Defect Management Area.

Byte 10~15: Reserved:
these 6 bytes are reserved and shall be set to 00h.

Byte 16~18: Start of General Purpose Area
These 3 bytes shall specify the Logical Block Number (LBN) of the first User Data Block of the first Packet in the General Purpose Area. Byte 16 bit 7~4 are reserved and shall be set to zero.

Byte 16, bit 7~4: Reserved
bit 3~0: LBN of first User Data Block of GPA Byte 17,
bit 7~0: LBN of first User Data Block of GPA
Byte 18,
bit 7~0: LBN of first User Data Block of GPA
Byte 19,20: Size of Replacement Area
These 2 bytes shall specify the number of Packets set aside for replacement of defective Packets.

Byte 21~23: Size of General Application Area
These 3 bytes shall specify the number of Packets set aside for the storage of data that is not under control of the Defect Management.

Byte 24,25: Disc status
These 2 bytes contain flags for indicating the status of the disc. They can be used for instance for tracking the Background Formatting process.

Byte 24

Bit 7~5: Formatting status
Bit 4~1: Reserved and set to zero
Bit 0: Dirty Disc Byte 24
Bit 7~0: Reserved and set to zero
Formatting status:

bit 7,6=00: disc is not formatted,
01: disc has been partially formatted,
10: disc has been fully formatted by the user,
11: disc has been fully formatted by the manufacturer.
Bit 5 is meant to be used as a "De-icing not ready" flag, details of which will be discussed hereinafter
Bit 5=1: indicates that the disc has been recorded non-consecutively, and that there are blank areas between some recordings.
Bit 5=0: indicates that all Packets between the start of the Program Area and the last recorded User Data in the Data Area (see FIG. 2) have been recorded or formatted.
Before ejecting a disc with bit 5 set to 1, the blank area(s) shall be formatted.
Dirty Disc:
Bit 0 is meant to be used as a general "Power Fail Flag".
It shall be set to 1 at each write action and shall be reset to 0 when the disc is closed and ejected in a normal way.

Byte 26~28: Last Written Address
These 3 bytes shall specify the Logical Block Number (LBN) of the first User Data Block of the last Packet that has been recorded or formatted. Byte 26 bit 7~4 are reserved and shall be set to zero.

Byte 26 bit 7~4: Reserved
bit 3~0: LBN of first User Data Block of last formatted Packet Byte 27
bit 7~0: LBN of first User Data Block of last formatted Packet
Byte 28
bit 7~0: LBN of first User Data Block of last formatted Packet
Byte 29~31: Reserved:
these 3 bytes are reserved and shall be set to 00h.
Byte 32~2047: DT replacement entries
Each DT Entry consists of 6 bytes. The first three bytes indicate a defective Packet and the last three bytes identify the Replacement Packet that has been assigned. The most significant bits of byte n and byte n+3 are used to indicate the status of the replacement. Unused bytes shall be set to 00h.

Byte n bit 7,6: Status 1
bit 5,4: Reserved 1
bit 3~0: Defective Packet LBN Byte n+1
bit 7~0: Defective Packet LBN
Byte n+2
bit 7~0: Defective Packet LBN
Byte n+3 bit 7,6: Status 2
bit 5,4: Reserved 2
bit 3~0: Replacement Packet LBN Byte n+4
bit 7~0: Replacement Packet LBN
Byte n+5
bit 7~0: Replacement Packet LBN The Defective Packet LBN shall be equal to the LBN of the first User Data Block in the defective Packet to be replaced. The Replacement Packet LBN shall be equal to the LBN of the first User Data Block in the Replacement Packet, that is assigned to hold the replaced Packet.
The value of Status and Reserved may be as defined as following:
Status 1:bit 7,6:

=00: the entry identifies a valid replacement,
=01: the entry identifies a defective Packet that has not been recorded at it's replacement address,
=10: the entry identifies a Replacement Packet usable for future replacement, the Defective Packet LBN shall be set to zero,
=11: the entry identifies a Replacement Packet unusable for future replacement, the Defective Packet LBN is unspecified.

Reserved 1:
bit 5,4 set to 00
Status 2: bit 7,6:

=00: the original location has been recorded with the same data as the replacement location,
=01: the original location may contain different data as the replacement location, =10: reserved,
=11: reserved.

Reserved 2:
bit 5,4 set to 00

The DT Entries in the tables shall be sorted in ascending order as if each DT Entry were a single 48 bit unsigned binary integer. There shall be no hierarchical replacements: no Replacement Packet LBN shall be equal to any Defective Packet LBN.

Next the lay-out of the Sentinel Packets will be explained with reference to FIG. 10. Each 2K block in the STL Packet shall have the contents as shown in FIG. 10. Herein the successive bytes have the following content:

Byte 0–2: Signature
These 3 bytes shall be set to: 53544Ch, representing the characters "STL", in each Block of an STL, Byte 3: version number:
this byte shall be set to 00h Byte 4,5: STL update count
These bytes shall indicate the total number of update operations on this STL Packet. This field shall be set to 0000h during the creation of the STL, and shall be incremented by one each time the STL is re-written. If the STL Packet is defective, this Packet shall be overwritten with an STL with the update count field set to FFFFh, indicating that this table is no longer valid.

Byte 6,7: Reserved:
these 2 bytes are reserved and shall be set to 00h.

Byte 8–2047: Reserved:
these 2040 bytes are reserved and shall be set to 00h.

As apparent from the above, each MDT/SDT/TDT is preceded by a Sentinel Packet (also referred to a Zero Packet). This packet may be used advantageously for storage of proprietary information such as copy right information. Information of this kind stored in the Lead-In area, is unreadable by a CD-ROM reader. To the contrary, a SDT is readable.

Next the Defect Management procedure will be discussed.

At Initialization (details of which be discussed later) an MDT is created, containing a DT Entry for each Replacement Packet, with Status 1=10, the Defective Packet LBN set to 00000h and Status 2=00. Packets found to be defective during reading by a recorder, can be indicated in the Defect Table with Status 1 set to 01, and the Defective Packet LBN set equal to the LBN of the first User Data Block of the defective Packet. If a Replacement Packet itself is found to be defective, it is indicated by Status 1=11. The Defective Packet LBN is undefined.

If an error is detected in a Packet during reading, the drive may replace the Packet, mark the Packet for replacement, or ignore the error. If the defective Packet is to be replaced or marked for replacement, the drive shall assign the Replacement Packet with Status 1=10 and the lowest LBN. If the Packet is replaced, then:

the data from the original Packet shall be recorded in the Packet identified by the Replacement Packet LBN.
the Status 1 field of the DT Entry shall be set to 00,
the Defect Table sort order shall be maintained, If the Packet is being marked for later replacement, then:

the Status 1 field of the DT Entry shall be set to 01,
the Defect Table sort order shall be maintained,
future read requests shall be fulfilled from the Packet identified by the Defective Packet LBN,
future write requests shall be handled by writing to the Packet identified by the Replacement Packet LBN, changing the Status 1 field to 00, and updating the Defect Table sort order. Optionally also the original location can be overwritten. The Status 2 field shall be set accordingly.

Next the back-ground formatting will be explained in more detail. The disc shall be considered fully formatted if the Lead-in Area, the maximally possible Program Area and the Lead-out Area have been recorded. The user data bytes in the 2K Blocks can contain relevant data or can be set to dummy data (all bytes AAh). The disc shall be considered partially formatted if at least the MDT in the Lead-in Zone has been recorded. The status of the disc shall be indicated by the Disc Status and the Last Written Address fields contained in the MDT. If compatibility with CD-ROM drives is required, then the disc shall contain a Lead-in Area, a Lead-out Area, and a Program Area with no blank areas between the Lead-in and Lead-out areas. Formatting is the process to reach the status of CD-ROM compatibility. Formatting can be done in two different ways:

By pre-formatting, which is the conventional way of formatting used for many storage media. After the pre-formatting process, the disc is fully formatted. User Data shall not be recorded to the disc until the pre-formatting process is complete. This process generally consists of the following steps:

write Lead-in Zone, write Data Zone, write Lead-out Zone, verify the Data Zone (optional) including updating DMAs (if present).

Formatting can also be done as: Back-ground Formatting, which is a formatting process that runs in the background during use of the disc on a recorder. After the Back-ground Formatting process, the disc is fully formatted. User Data may be recorded to the disc during the Back-ground Formatting process. The Back-ground Formatting process consists of the following steps:

Initialization

De-icing

Finalization

Early-eject closing (if applicable)

Re-opening an early-ejected disc

Verification

Because the Pre-formatting process may be rather time consuming, Background Formatting can be a much more time-efficient solution for the user of the disc. During the Back-ground Formatting process only a minimum amount of data will be recorded onto the disc, after which the disc can be used by the application. A disc on which a Back-ground Formatting process is active, may be formatted further by the CD recorder in the background during the moments that the application is not accessing the disc.

Next the initialization will be explained. When a blank disc is inserted into a recorder, an initialization procedure is started by the host computer. This initialization creates an STL and MDT at the end of the Lead-in Area, according to a set of parameters given by the host computer, such as: Start of GPA, Size of Replacement Area, Size of GAA. In general the host computer also writes some initial File System Structures (FSS) to the disc. These File System Structures as well as the User Data can be placed anywhere in the logically addressable space of the disc. In the following examples it is assumed that the disc is initially recorded sequentially. As a result of the initialization procedure the following disc, as shown schematically in FIG. 11 will exist. Because of the very limited amount of data to be recorded, the initialization procedure will be finished just in seconds. The disc is now ready for data storage and can be released for the application.

Next the de-icing will be explained, with reference to FIG. 12, showing the status of a disc after some de-icing and recording. De-icing is the process of recording all Packets in the Program Area of the disc. During the de-icing phase, unrecorded areas shall be filled with Packets containing 2K Blocks with all AAh bytes or with User Data when requested. The De-icing shall be performed by the drive itself, without any support from the host computer. During the time intervals when the drive is idle, the De-icing process can proceed in the background. When the application or OS requests disc access, the De-icing process is suspended and the control of the disc is returned to the OS. Application requested writes in blank areas shall be registered by the drive and shall not be overwritten by the Deicing process. The drive shall keep track of all areas that have been recorded or de-iced.

Next finalization will be discussed in more detail, with reference to FIG. 13, showing the status of a disc after several steps of finalization. After the full Data Area and the General Purpose Area have been recorded or de-iced, the Lead-in and Lead-out Area are recorded. To be able to interrupt the recording of the Lead-in and the Lead-out Area on write/read requests from the host computer, the Lead-in area as well as the Lead-out area are written in variable Packet size. The Lead-in and Lead-out should be recorded continuously until the moment of the interrupt request, after which the recording shall stop by writing a Packet end (2 Run-out Blocks and a partial Link Block). After the action requested by the host has been finished, writing to the Lead-in or Lead-out is resumed with a Packet start (partial Link Block and 4 Run-in Blocks) followed by User Data Blocks. To prevent too much fragmentation in the Lead-in and Lead-out area, each Packet shall be at least of a size of 128 User Blocks. At the end of the finalization process the host computer overwrites the General Application Area with the required files, updates the File System Structures and creates additional File System Structures if needed (e.g. UDF secondary AVDP).

Next the process of ejecting a disc from a recorder is explained, with reference to FIG. 14 which shows an example of the final status of a disc. When the disc is ejected from the recorder the MDT Packet shall be copied to the SDT Packet.

However, early ejecting may be feasible as explained hereinafter, with reference to FIG. 15, showing an early eject status of the disc. When the user pushes the eject button of the drive, he is expecting the disc to come out in the shortest possible time. However he also expects that the disc is "ROM-compatible". This means that the disc shall have at least a Lead-in and a Lead-out Area and no blank areas in the Program Area. If the Back-ground Formatting process is not yet finished, the drive may decide to finish the deicing and finalization processes in the normal way. If the remaining formatting will take too much time to finish, then the drive can decide to close the disc in a temporary ROM-compatible way, for which the following steps are needed (see FIG. 15):

write/read requests from the computer shall be completed and the active de-icing process stops, if recordings have been made in blank areas, all blank areas up to the last recorded Packet shall be de-iced, 1) Only Replacement Packets that are actually in use (indicated in the MDT with Status 1=00) are copied to the location immediately following the area reserved for the temporary GAA.

2) An adapted copy of the MDT is placed as TDT (Temporary Defect Table) next to the copied Replacement Packets, together with an STL and a Reserved Packet:

the signature in the copy shall be set to 544454h the DT Entries in the TDT shall point to the temporary Replacement Packets, while the DT Entries in the MDT shall not be changed (still pointing to the Replacement Packets in the final GPA), the LWA (Last Written Address) in both the MDT and TDT shall be set to the LBN of the first User Data Block of the temporary Reserved Packet, all other fields in the MDT and TDT shall be unchanged and reflect the values of the final disc after formatting has been fully completed, if the SLT and/or TDT can not be written correctly at the intended location, then the next 2 Packets shall be used. The TDT shall always be the last but one Packet before the start of the temporary Lead-out.

3) A Lead-out Area of at least 30 seconds is recorded. If this Lead-out is going to overlap recorded Packets in the final General Purpose Area, then the normal De-icing and Finalization processes shall be finished instead of applying this Early-eject procedure.

4) The Lead-in Area, with subcode data according to the actual situation of the disc, is recorded.

5) The OS writes the GAA immediately following the last Packet that has been de-iced or recorded, the temporary GAA shall have the same size as the final GAA.

6) The OS updates the file system structures and writes required additional structures, 7) If all data to be stored in the GAA does not occupy all Packets, then the remaining Packets shall be de-iced.

8) The TDT is updated, including the reset to 0 of the Dirty Disc bit.

9) The MDT is updated, including the reset to 0 of the Dirty Disc bit.

Figure 16:
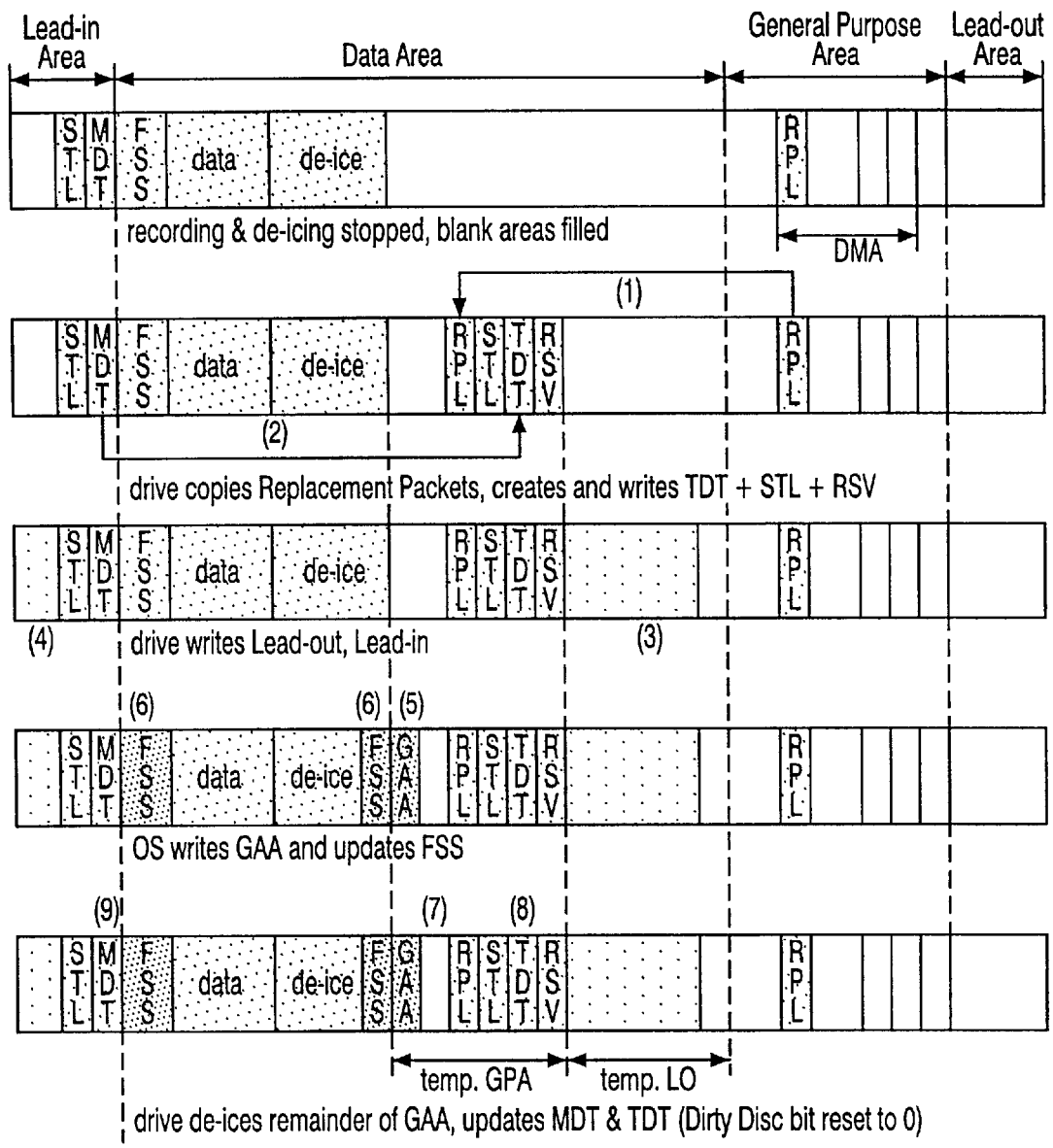

Next re-opening and early-ejected disc will be discussed, with reference to FIG. 16, showing the re-opened status of the disc. When an early-ejected disc is re-inserted into a recorder, this device will detect the "partially formatted" status and the host computer can initiate the continuation of the Back-ground Formatting. De-icing shall restart from the position indicated by the LWA pointer (see FIG. 15), thus starts overwriting the temporary Lead-out Area. It will proceed until the full disc has been de-iced/finalized. The Replacement Packets already present in the final GPA shall not be overwritten. The temporary GPA is considered as being formatted. Links of the file system to the temporary GAA are invalid.

New write requests can overwrite the temporary GPA. Before a next eject, the OS shall update the File System Structures.

Finally it is remarked that although he invention has been described with reference to preferred embodiments thereof, it is to be understood that these are not limitative examples. Thus, various modifications thereof may become apparent to those skilled in the art, without departing from the scope of the invention, as defined by the claims. For instance a CD-RW may be replaced with a DVD-RW or the like.

Figure 17:
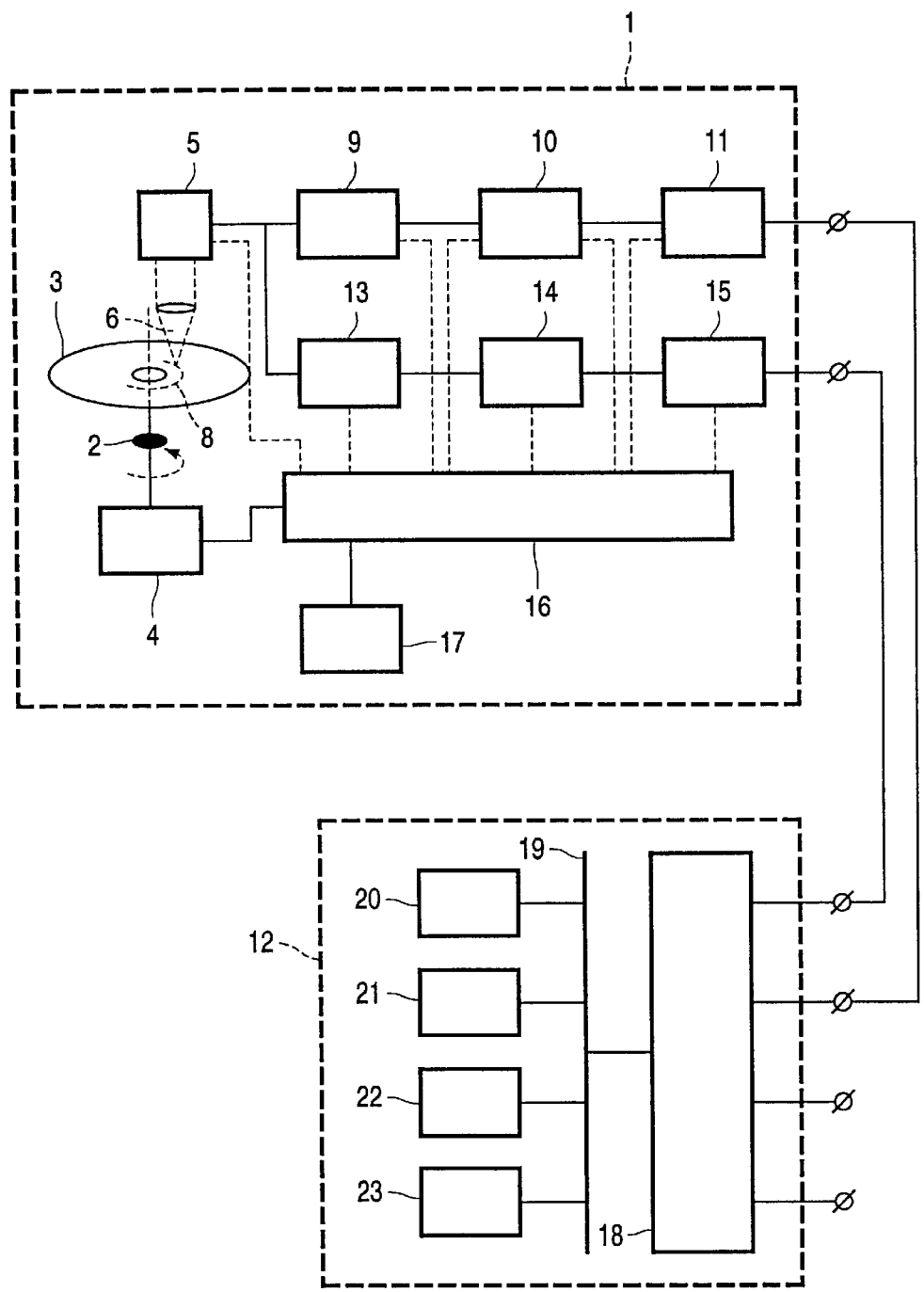

Next an embodiment of a computer data system comprising a computer and a recording apparatus according to the invention will be described, with reference to FIG. 17. The recording apparatus 1 comprises recording medium receiving means 2 for receiving a removable recording medium 3.

The recording medium 3 may be a disc of the optically readable type such as CD-RW, DVD-RAM or DVD-RW. The recording medium 3 is rotationally driven by rotation means 4. An optical pick-up unit 5, movable in a radial direction of the recording medium 3, writes optically detectable marks along a spiral track 8 on the recording medium 3 employing a light beam 6. To this purpose the recording medium 3 is provided with a suitable phase change material which has different optical properties in crystalline or amorphous states. Heating with the light beam 6 may induce these states. The light beam 6 is modulated by recording means 9 according to digital information signals to be recorded. These digital information signals have been suitable encoded with encoding means 10, employing EFM modulation and CIRC error encoding, as prescribed by the CD-standards. Inputting means 11, which may employ suitable interface means, receive the digital information signals from a connected computer 12.

Alternatively, recorded digital information signals on the recording medium 3, may be read via the same optical pick-up unit 5, by suitable reading means 13. These are connected to decoding means 14 to perform EFM decoding and CIRC error correction processing. The decoded and corrected signal are outputted, via outputting means 15, comprising suitable interface circuitry, to the computer 12.

All units are controlled by a controlling unit 16 connected to memory means 17, such as for example a non-volatile ROM. The controlling unit 16 may comprise a processing unit which operates according to a specific program loaded in the memory means 17, in order to perform the method according to the invention, either independent or under control of the computer 12.

The computer 12 comprises interface circuitry 18 adapted to receive digital information signals from the recording apparatus 1 or to send digital information signals to the recording apparatus 1. The digital information signals may comprise, apart from signals read from the recording medium 3 or to be recorded thereon, control signals from the computer 12 to control the recording apparatus 1.

The interface circuitry 18 is connected to an internal data and address bus 19 in order to exchange data and control signals with a hard disk unit 20, a RAM memory unit 21, a central processor unit 22 and a ROM memory unit 22. The computer 12 may be loaded with a suitable operating system and a device driver to operate with the recording apparatus 1. In case of a recording apparatus according to the invention, the recording apparatus 1 will perform the major parts of the method according to the invention itself, such as back-ground formatting or defect management, without requiring excessive interaction with the computer 12. In that case the computer 12 will only interact with the recording apparatus 1 in case of write, read or eject requests and the like.

However, an other embodiment of the invention is obtained when the recording apparatus 1 is not adapted to perform independently the method of the invention, such as in case of a legacy CD-RW writer or CD-ROM reader. In this case the computer 12 will have to use a dedicated device driver, loaded in the corresponding memory units of the computer 12, to control the recording apparatus 1 in such a manner to perform at least the defect management according to the method of the invention. Such a dedicated device driver may be obtained from the recording medium 3 itself or from other external means such as internet.

The invention may be implemented by means of both hardware and software, and that several "means" may be represented by the same item of hardware. Further, the invention lies in each and every novel feature or combination of features. It is also remarked that the word "comprising" does not exclude the presence of other elements or steps than those listed in a claim. Any reference signs do not limit the scope of the claims.

What is claimed is:

1. A method comprising:

inserting a blank writable disc into a recorder;

formatting the disc, wherein the formatting includes an initializing, the initializing includes recording control data in a lead-in area, the control data defines a general purpose area (GPA) within a program area of the disc, and the program area follows the lead-in area;

recording user data within the program area after the initializing, wherein the recording includes recording data in a user portion of the program area that is outside of the general purpose area (GPA);

continuing the formatting of the disc after some of the user data has been recorded, wherein the continued formatting includes recording format data in the user portion of the program area;

prior to ejecting the disc from the recording apparatus, when the formatting of the disc is not yet complete, finalizing the disc by recording additional control data in the lead-in area and in a lead-out area without completing the formatting of the entire disc, wherein the lead-out area follows the program area.

2. A recorder comprising:

a disc drive for receiving a blank writable disc inserted into The recorder;

formatting means for formatting the inserted disc, wherein the formatting includes an initializing, the initializing includes recording control data in a lead-in area, the control data defines a general purpose area (GPA) within a program area of the disc, and the program area follows the lead-in urea;

writing means for recording user data within the program area after the initializing, wherein the recording includes recording data in a user portion of the program area that is outside of the general purpose area (GPA);

and wherein:

the formatting means continues the formatting of the disc after some of the user data has been recorded, the continued formatting includes recording format data in the user portion of the program area; and the formatting includes a finalizing and when the disc is ejected from the drive prior to completing the formatting, then the finalizing is completed prior to the ejecting, and the finalizing includes writing additional control data in the lead-in area and in a lead-out area without completing the formatting of the entire disc, the lead-out area follows the program area.

3. The recorder of claim 2, wherein the initializing includes defining a main defect table (MDT) in the lead-in area adapted to contain a list of address of defect areas and replacement areas, and defining a defect management area (DMA) within the general purpose area (GPA) adapted to contain replacement areas for defect management.

4. The recorder of claim 2, wherein the initializing includes defining a general application area (GAA) within the general purpose area (GPA) adapted to contain application drivers adapted to handle defect management and/or support of specific operating systems.

5. The recorder of claim 3, wherein the formatting includes replacing defect areas with replacement areas in the defect management area (DMA) and recording the addresses of the defect areas and corresponding replacement areas in the main defect table (MDT) in the lead-in area.

6. The recorder of claim 2, wherein the initializing includes defining a sentinel area (STL) within the lead-in area, the sentinel area contini8ng dummy data adapted to be overwritten by a new main defect table when the main defect table (MDT) becomes defective.

7. The recorder of claim 2, wherein in the formatting includes a deicing formatting that includes recording dummy data in blank areas within the data area.

8. The recorder of claim 7, wherein the deicing formatting is continued in the background, when user data is not being written, until the data area that is not already recorded with user data has been completely recorded with dummy data or until the finalizing.

9. The recorder of claim 3, wherein when the formatting of the disc is complete, the finalizing includes completing the recording of the lead-in and lead-out area, recording the general application area (GAA) with the required data if needed, and recording a copy of the main defect table (MDT) as a secondary defect table (SDT) in the general purpose area (GPA).

10. The recorder of claim 2, wherein when the disc is ejected prior to completing the formatting then the finalizing includes:
  completing recording or reading requests;
  stopping the deicing after deicing all blank areas up to the last positioned area recorded with user data;
  recording a temporary general purpose area next to area with the last recorded user data or to the last deiced area;
  copying replacement areas actually in use within the defect management area (DMA) to the area immediately followed by the temporary general application area;
  copying and adapted copy of the main defect table (MDT) as a temporary defect table (TDT) next to the copied replacement areas;
  recording a temporary lead-out area next to the temporary defect table; and
  recording additional control data in the lead-in area.

11. The recorder of claim 2, wherein when a disc that was previously ejected prior to completing the formatting is re-inserted into the recorder, then the formatting means continues to complete the formatting of the reinserted disc.

12. The recorder of claim 9 wherein the writing means uses the secondary defect table (SDT) for defect management during the recording of the user data.

13. The recorder of claim 10 wherein the writing means uses the temporary defect table for defect management during the recording of the user data.

14. The recorder of claim 2, wherein the recording medium is of the rewritable optical type.

15. The recorder of claim 2, wherein the recording medium is a CD of the rewritable type and which is in a CD-ROM compatible state after ejection prior to completing the formatting.

16. A method comprising:
  on a removable rewritable disc like recording medium, the recording apparatus comprising,
    receiving digital information signals;
    receiving a removable rewritable disc-like recording medium;
    formatting the disc including an initializing, the initializing includes recording control data in a lead-in area, the control data defines a general purpose area (GPA) within a program area of the disc, and the program area follows the lead-in area;
  recording the digital information signals onto the removable medium;
  continuing the formatting of the disc after some of the user data has been recorded, wherein the continued formatting includes recording format data in the user portion of the program area;
  prior to ejecting the disc from the recording apparatus, when the formatting of the disc is not yet complete, finalizing the disc by recording additional control data in the lead-in area and in a lead-out area without completing the formatting of the entire disc, wherein the lead-out area follows the program area;
  reading the recorded digital information signals recorded from the removable medium; and
  outputting the read digital information signals.

17. The recorder of claim 2 wherein the writing means record recording medium status information on recording medium, the recording medium status information indicating whether formatting was completed, and the writing means continues the formatting when a disc is reinserted into the recorder when the status information indicates that the formatting was not completed.

18. The recorder of claim 17, wherein the status information includes an indication areas of the program area that have been recorded or formatted.

19. The recorder of claim 17, wherein the status information includes the address of the recorded or formatted area positioned latest in the program area of the recording medium and the recorder resumes recording or deicing respectively from this latest area.

20. The recorder of claim 2, the writing means read digital information signals recorded on the recording medium.

21. A computer data system comprising:
  the recorder of claim 2; and
  a computer connected to the recorder for recording computer data on the disc of the recorder.

22. Programming apparatus for programming a programmable recorder, comprising:
  formatting means for programming the recorder for formatting a blank writable disc, the formatting including an initializing, the initializing includes recording control data in a lead-in area, the control data defines a general purpose area (GPA) within a program area of the disc, and the program area follows the lead-in area;
  writing means for programming the recorder for recording user data within the program area after the initializing, the recording includes recording data in a user portion of the program area that is outside of the general purpose area (GPA);
  and wherein
  the recorder continues the formatting of the disc after some of the user data has been recorded, the continued formatting includes recording format data in the user portion of the program area;
  prior to ejecting the disc from the recording apparatus, when the formatting of the disc is not yet complete, the recorder finalizing the disc by recording additional control data in the lead-in area and in a lead-out area without completing the formatting of the entire disc, the lead-out area follows the program area.

23. The programming apparatus of claim 22 consisting of signals in a physical medium which signals can be directly introduced to the programmable recorder to program an internal memory of the recorder to control a processor of the recorder and wherein the formatting means and the writing means consist of portions of the signals.

24. Signals in a physical medium, which signal are produced by the process of claim 1 and recorded on the recordable disc, and useable to control the processing of the user data in a disc player.

* * * * *